US012535958B2

(12) United States Patent
Subramanian

(10) Patent No.: US 12,535,958 B2
(45) Date of Patent: Jan. 27, 2026

(54) NETWORK ATTACHED STORAGE (NAS) SERVER PLACEMENT IN A HETEROGENEOUS STORAGE CLUSTER

(71) Applicant: Dell Products L.P., Round Rock, TX (US)

(72) Inventor: Vasudevan Subramanian, Chapel Hill, NC (US)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 18/230,060

(22) Filed: Aug. 3, 2023

(65) Prior Publication Data

US 2025/0044961 A1 Feb. 6, 2025

(51) Int. Cl.
  *G06F 3/06* (2006.01)
(52) U.S. Cl.
  CPC .......... *G06F 3/0631* (2013.01); *G06F 3/0604* (2013.01); *G06F 3/067* (2013.01)
(58) Field of Classification Search
  CPC ...... G06F 3/0631; G06F 3/0604; G06F 3/067; G06F 9/5077; G06F 9/45558; G06F 2009/4557; G06F 9/4856; G06F 9/5027; G06F 9/5083; G06F 3/0646–0647; G06F 3/0655; G06F 3/0662–0667
  See application file for complete search history.

(56) References Cited

U.S. PATENT DOCUMENTS

| 10,789,017 | B1 * | 9/2020 | Bono ..................... G06F 3/0644 |
| 2017/0264493 | A1 * | 9/2017 | Cencini ............... H04L 67/1008 |
| 2019/0227845 | A1 * | 7/2019 | Sridhar ................. G06F 9/5044 |
| 2020/0242000 | A1 * | 7/2020 | Khosrowpour ..... G06F 11/3608 |
| 2021/0263651 | A1 * | 8/2021 | Sandvig ............... G06F 3/0641 |

OTHER PUBLICATIONS

Roozbeh, Amir, et al. "Software-defined "hardware" infrastructures: A survey on enabling technologies and open research directions." IEEE Communications Surveys & Tutorials 20.3 (2018): 2454-2485. (Year: 2018).*

* cited by examiner

Primary Examiner — Kenneth M Lo
(74) Attorney, Agent, or Firm — Krishnendu Gupta; Derek Lam

(57) ABSTRACT

Techniques are disclosed for network attached storage (NAS) server placement in a heterogeneous storage cluster. An example system includes at least one processing device including a processor coupled to a memory. The at least one processing device can be configured to implement the following steps: identifying a placement event associated with a NAS asset in a heterogeneous storage cluster, where the NAS asset is located on an initial appliance in the cluster, obtaining resource characteristics associated with the NAS asset, analyzing the resource characteristics to identify an available appliance in the cluster, and deploying the NAS asset to the identified appliance.

20 Claims, 5 Drawing Sheets

NETWORK ATTACHED STORAGE (NAS) SERVER PLACEMENT IN A HETEROGENEOUS STORAGE CLUSTER

FIELD

Example embodiments generally relate to data storage, e.g., placement of network attached storage (NAS) assets in a storage cluster. More specifically, at least some embodiments relate to systems, hardware, software, computer-readable media, and methods for placing NAS servers in a heterogeneous storage cluster.

BACKGROUND

Storage appliances can be clustered and in some existing storage systems, the appliances in the cluster can be heterogenous. In a heterogenous cluster, the appliances in the cluster could have different generations of CPU, different number of CPU cores, different memory sizes, or different drive types. Each volume or filesystem is hosted on a specific appliance and the appliance's hardware characteristics impact the eventual performance seen by applications running on hosts connected to the appliance. From an I/O performance perspective, the hardware characteristics of the appliance hosting the volume generally determine the performance seen by the application. In a cluster, volumes and filesystems can migrate between the appliances but at any point in time, the volumes and filesystems provide services to hosts from a specific appliance. Furthermore, any network attached storage (NAS) servers associated with the data are required to be co-located with any migrated data in order to retain access to the data.

When the appliance is accessed by external hosts, the hosts see the performance characteristics of the appliance in the cluster hosting the requested data. To improve performance for these external hosts, the sole option available is to migrate the data along with the associated NAS server in a homogeneous placement from one appliance to another, and provide better performance using the destination appliance.

SUMMARY

In one embodiment, a system comprises at least one processing device including a processor coupled to a memory. The at least one processing device can be configured to implement the following steps: identifying a placement event associated with a NAS asset in a heterogeneous storage cluster, where the NAS asset is located on an initial appliance in the cluster, obtaining resource characteristics associated with the NAS asset, analyzing the resource characteristics to identify an available appliance in the cluster, and deploying the NAS asset to the identified appliance.

In some embodiments, the NAS asset comprises a NAS server and an associated filesystem configured for remote access to storage located on a different appliance in the cluster. The NAS asset can comprise storage that is remotely accessible by a NAS server and an associated filesystem located on a different appliance in the cluster. The resource characteristics can comprise compute characteristics including one or more of CPU core count, CPU speed, and CPU usage history. The resource characteristics comprise memory characteristics including one or more of memory size, memory used, input-output (I/O) request size distribution, I/O request type, ratio of sequential access history to random access history, ratio of read operations to write operations, and I/O per second (IOPs) count. The resource characteristics can comprise network characteristics including one or more of network latency and network throughput. The resource characteristics can comprise storage characteristics including one or more of a storage type and storage latency. The storage latency can include a first portion attributable to read operations and a second portion attributable to write operations. The resource characteristics can comprise filesystem characteristics including one or more of a filesystem request size distribution, filesystem metadata access patterns, ratio of random access history to sequential access history, IOPs count, ratio of read operations to write operations, compute latency, and storage latency. The compute latency can include a first portion attributable to read operations and a second portion attributable to write operations. The resource characteristics can comprise a compute capacity of the initial appliance and a compute capacity of the available appliance, and the compute capacity can comprise compute characteristics or memory characteristics of a given appliance. Analyzing the resource characteristics can include determining the compute capacity of the initial appliance to be insufficient, and configuring the NAS asset for remote access from the available appliance. Deploying the NAS asset to the available appliance can be performed when the compute capacity of the available appliance exceeds the compute capacity of the initial appliance. The resource characteristics can comprise compute characteristics, storage characteristics, and network characteristics of the initial appliance and compute characteristics, storage characteristics, and network characteristics of the available appliance. The storage characteristics can include a local storage latency of storage associated with the initial appliance and a remote storage latency of storage associated with the available appliance, and the network characteristics can include a network latency of a network connecting the initial appliance and the available appliance. Analyzing the resource characteristics can comprise using the compute characteristics, storage characteristics, and network characteristics to predict expected performance of the cluster if the NAS asset is deployed to the available appliance. Using the compute characteristics, storage characteristics, and network characteristics to predict expected performance can comprise: determining the storage characteristics of the initial appliance to be insufficient if the network latency and the remote storage latency are collectively shorter than the local storage latency, and configuring the NAS asset for remote access from the available appliance. Deploying the NAS asset to the available appliance can be performed when at least some of the compute characteristics or storage characteristics of the available appliance exceed corresponding compute characteristics or storage characteristics of the initial appliance.

Other example embodiments include, without limitation, apparatus, systems, methods, and computer program products comprising processor-readable storage media.

Other aspects will be apparent from the following detailed description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the Drawings.

DETAILED DESCRIPTION

Example embodiments generally relate to data storage, e.g., placement of network attached storage (NAS) assets in a storage cluster. More specifically, at least some embodiments relate to systems, hardware, software, computer-readable media, and methods for placing NAS servers in a heterogeneous storage cluster.

Disclosed herein are techniques for placement of NAS servers in a heterogeneous storage cluster. More particularly, embodiments provide an ability to have NAS assets such as compute resources and storage resources be located on different appliances (for example, non-co-located) based on metrics and analysis of resource characteristics in a multi-appliance storage cluster. For NAS server deployment in a multi-appliance cluster, differences among example resource characteristics, including but not limited to compute characteristics, memory characteristics, network characteristics, storage characteristics, and filesystem characteristics in the various appliances in a heterogenous cluster, can receive special consideration so that applications and users that benefit from increased performance can be provided enhanced performance based on intelligent placement of a NAS server compute engine and improved placement and usage of storage assets (for example, disks).

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
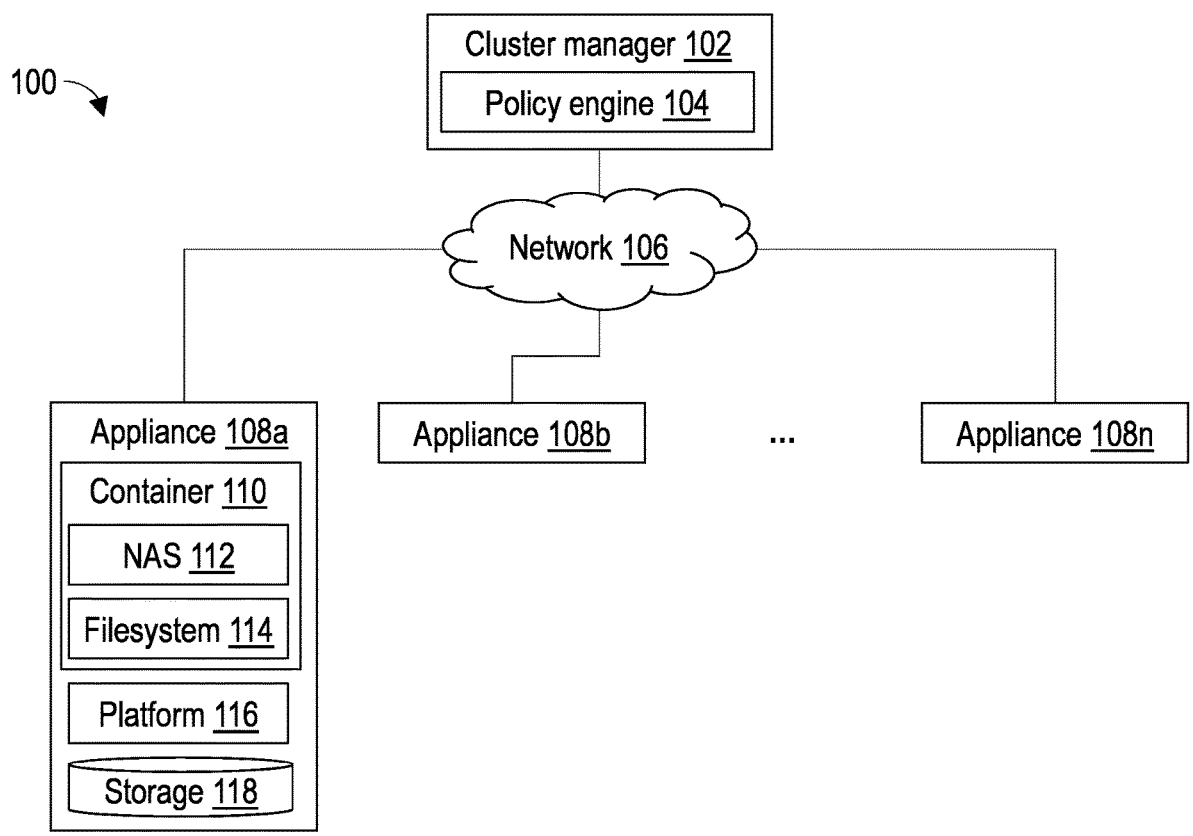
FIG. 1 discloses aspects of an example storage cluster, in accordance with illustrative embodiments.

FIG. 1 shows aspects of an example storage cluster, in accordance with illustrative embodiments. In particular, FIG. 1 illustrates a storage cluster 100 including a cluster manager 102 communicatively coupled with appliances 108a, 108b, ..., 108n using a network 106.

The cluster 100 includes one or more appliances 108a, 108b, ... 108n (collectively, 108) in a single group or federation and management interface. Clusters are expandable by adding more appliances to the existing cluster, up to an allowed amount for a cluster. By way of example and not limitation, in at least one existing storage system, a cluster allows adding 1, 2, 3, or 4 appliances. The cluster can be heterogenous, which refers to the resource characteristics of various appliances being different from one another. In a heterogeneous cluster, appliances having different resource characteristics can be mixed. Accordingly, by way of non-limiting example the appliances could have different generations of CPU, different numbers of CPU cores, different memory sizes, or have different storage drive types.

The cluster manager 102 provides management of the appliances 108 in the cluster 100. The cluster manager includes a policy engine 104. Although FIG. 1 shows the cluster manager 102 as separate from the appliances 108 for ease of illustration, in some embodiments the cluster manager 102 can be integrated into a given appliance without departing from the scope of embodiments described herein.

The policy engine 104 is an analytical engine configured to manage performance within the cluster 100. Example embodiments of the policy engine are configured to manage the appliances 108 to enhance initial placement of NAS assets, and improve migration of NAS assets, for example as the cluster is operating in steady state. An example embodiment of a policy engine includes the Resource Balancer provided in the PowerStore storage product family.

The network 106 communicatively couples the cluster manager 102 and the appliances 108. The network can include a fibre channel (FC) network, the Internet, a local area network (LAN), a wide area network (WAN), and any other suitable type of network. The network can exhibit various resource characteristics between appliances 108, such as network latency and network throughput.

The appliances 108 are configured to provide access to NAS assets. In example embodiments, each appliance 108a, 108b, ..., 108n includes a container 110, platform 116, and storage 118. In some embodiments, the appliance can include multiple redundant nodes to facilitate high availability and fallback alternatives. For example, in at least one existing storage system, each appliance can have two nodes.

The appliances 108 and nodes can have various resource characteristics, such as different CPU types, CPU generations, CPU core counts, memory sizes, storage types, and the like for processing the data served by the appliance. The appliances are clustered from a single-plane-of-glass management perspective but from an I/O performance perspective, the hardware characteristics of the appliance hosting the volume determine the overall performance seen by a given application. When external hosts access the appliance for block access via Fiber Channel or TCP (e.g., ISCSI, NVMe) access, the external hosts see the resource characteristics of the appliance in the cluster 100 hosting the block volume. In conventional storage systems, for better performance for these external hosts, the only option available is to migrate the data from one appliance to another and provide better storage performance based on the destination appliance usage and hardware characteristics.

The containers 110 implement various types of functionality within the present placement system, such as NAS functionality. For example, the container 110 includes NAS 112 and filesystem 114. In example embodiments, the container provides a runtime used to implement respective processing devices providing compute or storage services of a cloud-based system. In some embodiments, the container is a software-defined network attached storage (SDNAS) container. By way of example and not limitation, the container can be a Docker container or other type of Linux Container (LXC).

The NAS 112 is configured to receive filesystem read or write requests (as well as other filesystem requests) and execute the received requests by reading, writing, deleting, or otherwise moving data on the storage 118. In example embodiments, the NAS includes a NAS server. In the example shown in FIG. 1, the NAS and the filesystem 114 are co-located with their associated storage. However, example embodiments alternatively allow the NAS and the filesystem to be non-co-located with their associated storage. For example, the NAS and the filesystem can be configured for remote access to storage that is located on a different appliance 108 in the cluster 100.

Example filesystems 114 include CIFS (Common Internet File System), SMB (Server Message Block), and Network File System (NFS) which provide host or application access to file data that corresponds to block data stored on the storage 118. Each volume or filesystem is hosted on a specific appliance, such as the appliance 108a. In the cluster 100, volumes and filesystems can migrate between the appliances but at any point in time, the volumes and filesystems provide services to hosts from a specific appliance. Accordingly, in example embodiments, as mentioned the filesystems and the NAS 112 can be non-co-located with the block data persisted on the storage. In some embodiments, the resource characteristics of the appliance impact the eventual performance experienced by applications running on hosts connected to the appliance. These resource characteristics can include filesystem characteristics. Non-limiting example filesystem resources include filesystem request size distribution, filesystem metadata access patterns, ratio of random access history to sequential access history, IOPs count, ratio of read operations to write operations, compute latency, and storage latency.

Platform 116 provides infrastructure that allows the appliance 108 to operate. By way of example and not limitation, the platform can include resources such as CPU and memory. These resources can have resource characteristics that are experienced by hosts and appliances accessing services on an associated application. For example, the resource characteristics can include compute characteristics. Non-limiting example compute characteristics include CPU core count, CPU speed, and CPU usage history. The resource characteristics can also include memory characteristics. Non-limiting example memory characteristics include memory size, memory used, input-output (I/O) request size distribution, I/O request type, ratio of sequential access history to random access history, ratio of read operations to write operations, and I/O per second (IOPs) count.

Storage 118 can include a storage array of physical storage resources that are accessible by the NAS 112 and the filesystem 114. In the example shown in FIG. 1, the filesystem and the NAS are co-located with their associated storage. However, example embodiments alternatively allow the storage to be non-co-located with a NAS and filesystem that are located on a different appliance. For example, the storage can be remotely accessible by the NAS server and the filesystem. The storage can have resource characteristics including storage characteristics. Non-limiting example storage characteristics include storage type and storage latency. The storage latency can include a first portion attributable to read operations and a second portion attributable to write operations.

Figure 2:
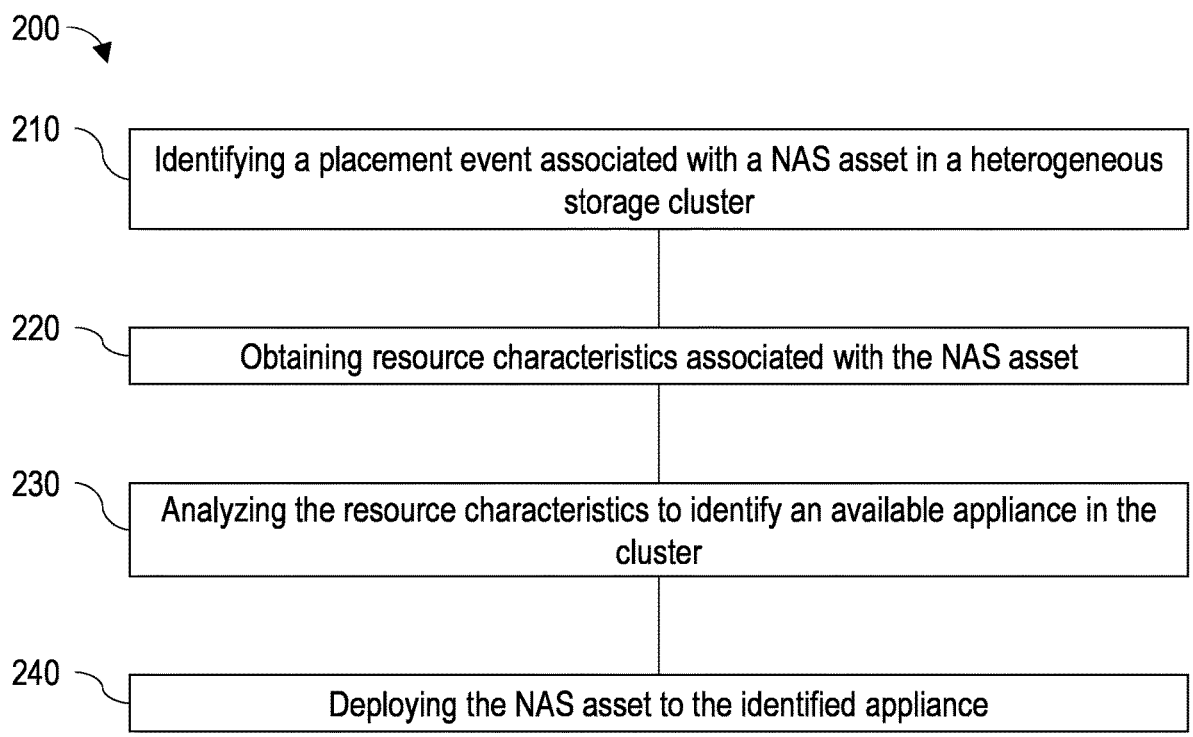
FIG. 2 discloses a flowchart of an example method, in accordance with illustrative embodiments.

FIG. 2 shows a flowchart of an example method 200, in accordance with illustrative embodiments. In example embodiments, the method 200 allows for deploying or placing NAS servers in the heterogeneous cluster 100.

In some embodiments, the method 200 can be performed by the cluster 100, such as using a cluster manager 102 via a policy engine 104.

In example embodiments, the method 200 includes identifying a placement event associated with a NAS asset in a heterogeneous storage cluster (step 210). In one or more embodiments, the policy engine of the cluster manager obtains a placement request from a user. In one embodiment, the request is obtained from a host or application client used by the user. The request may be obtained using any appropriate method of data transmission without departing from embodiments disclosed herein. The request may include user selections. The request may include additional information associated with the placement of the NAS asset without departing from embodiments disclosed herein. The cluster manager may identify receipt of the placement request as the placement event associated with a NAS asset. In another embodiment, a user may directly submit user selections initiating a restoration of an NAS asset. The user may submit the user selections through a user interface (e.g., a graphical user interface, a command-line interface, a web page interface, etc.). The user interface may provide a view of all, or a portion of the NAS assets and the appliance information included in the cluster. The user may submit user selections by, for example, pushing one or more keys on a keyboard, clicking one or more icons, entering one or more commands, etc. The cluster manager may identify the receipt of the receipt of the user selections as the placement event associated with the NAS asset. The placement event associated with the NAS asset may be identified via other and/or additional methods without departing from embodiments disclosed herein.

The NAS asset can be located on an initial appliance in the cluster. In some embodiments, the NAS asset is a NAS server and associated filesystem that is non-co-located with storage that is located on a different appliance in the cluster. For example, the NAS server and filesystem are configured for remote access to storage located on the different appliance. In some embodiments, the NAS asset is storage that is non-co-located with a NAS server and filesystem that are located on a different appliance. For example, the storage is remotely accessible by the NAS server and filesystem.

In example embodiments, the method 200 includes obtaining resource characteristics associated with the NAS asset (step 220). Example resource characteristics can include, but are not limited to, compute characteristics, memory characteristics, network characteristics, and storage characteristics. Non-limiting example compute characteristics include CPU core count, CPU speed, and CPU usage history. Non-limiting example memory characteristics include memory size, memory used, input-output (I/O) request size distribution, I/O request type, ratio of sequential access history to random access history, ratio of read operations to write operations, and I/O per second (IOPs) count. Non-limiting example network characteristics include network latency and network throughput. Non-limiting example storage characteristics include storage type and storage latency. In example embodiments, the storage type includes hard drive and solid state drive such as a non-volatile memory express (NVMe) device. In some embodiments, the storage latency includes a first portion attributable to read operations and a second portion attributable to write operations. Non-limiting example filesystem characteristics include filesystem request size distribution, filesystem metadata access patterns, ratio of random access history to sequential access history, IOPs count, ratio of read operations to write operations, compute latency, and storage latency. In example embodiments, the compute latency includes a first portion attributable to read operations and a second portion attributable to write operations.

In example embodiments, the method 200 includes analyzing the resource characteristics to identify an available appliance in the cluster (step 230). For example, the resource characteristics can include a compute capacity of the initial appliance and a compute capacity of the available appliance, and the compute capacity can include compute characteristics or memory characteristics of a given appliance. Analyzing the resource characteristics can include determining the compute capacity of the initial appliance to be insufficient, and configuring the NAS asset for remote access from the available appliance.

In some embodiments, the resource characteristics include compute characteristics, storage characteristics, and network characteristics of the initial appliance and compute characteristics, storage characteristics, and network characteristics of the available appliance. The storage characteristics include a local storage latency of storage associated with the initial appliance and a remote storage latency of storage associated with the available appliance. The network characteristics include a network latency of a network connecting the initial appliance and the available appliance. Analyzing the resource characteristics includes using the compute characteristics, storage characteristics, and network characteristics to predict expected performance of the cluster if the NAS asset is deployed to the available appliance. Using the compute characteristics, storage characteristics, and network characteristics to predict expected performance includes determining the storage characteristics of the initial appliance to be insufficient if the network latency and the remote storage latency are collectively shorter than the local storage latency, and configuring the NAS asset for remote access from the available appliance. In some embodiments, analyzing the resource characteristics includes comparing the local storage latency against the network latency combined with the remote storage latency, and deploying the NAS asset to the available appliance is performed despite a determination that the local storage latency is faster than the network latency combined with the remote storage latency.

In example embodiments, the method 200 includes deploying the NAS asset to the identified appliance (step 240). In some embodiments, the NAS asset is a NAS server and filesystem associated with an initial appliance, and deploying the NAS asset includes migrating the NAS server to the identified appliance and updating the associated filesystem on the identified appliance to reference the remote storage on the initial appliance, where the storage is no longer co-located with the NAS server and the filesystem. In some embodiments, the NAS asset is storage associated with an initial appliance, and deploying the NAS asset includes moving or copying block data associated with the storage to a different storage of the identified appliance.

While the various steps in the example method 200 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 200 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Figure 3A:
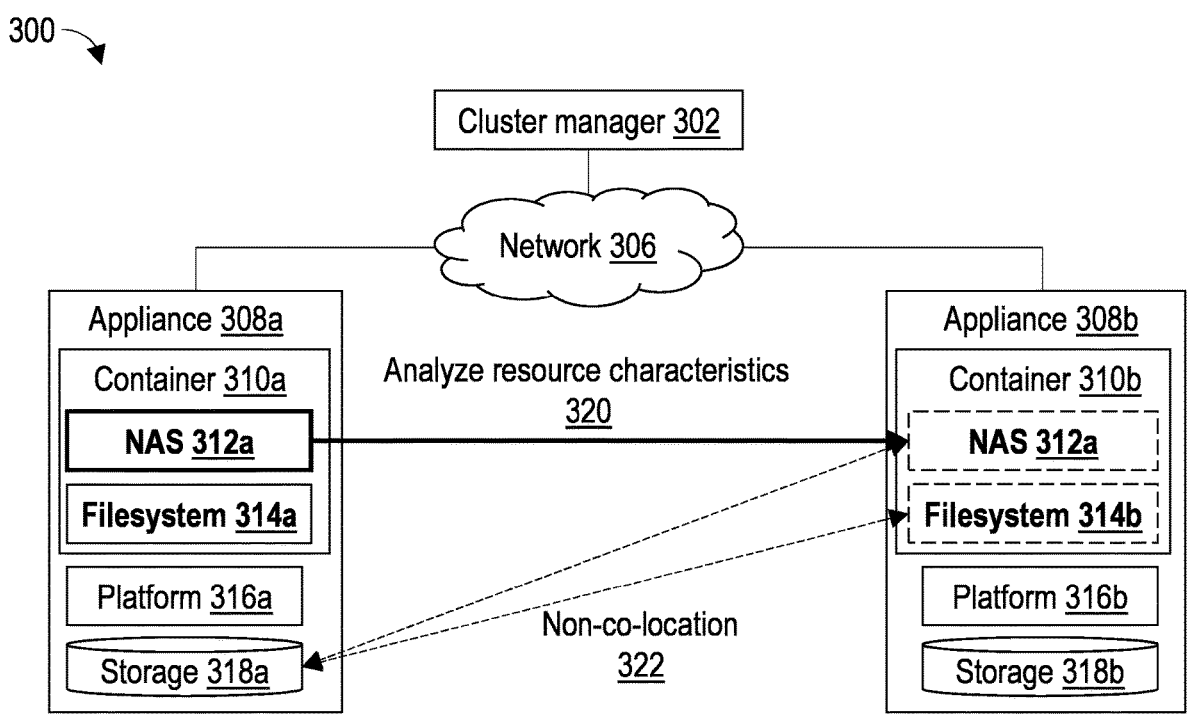
FIGS. 3A and 3B disclose aspects of example storage clusters in which NAS assets are moved to heterogeneous appliances, in accordance with illustrative embodiments.
Figure 3B:
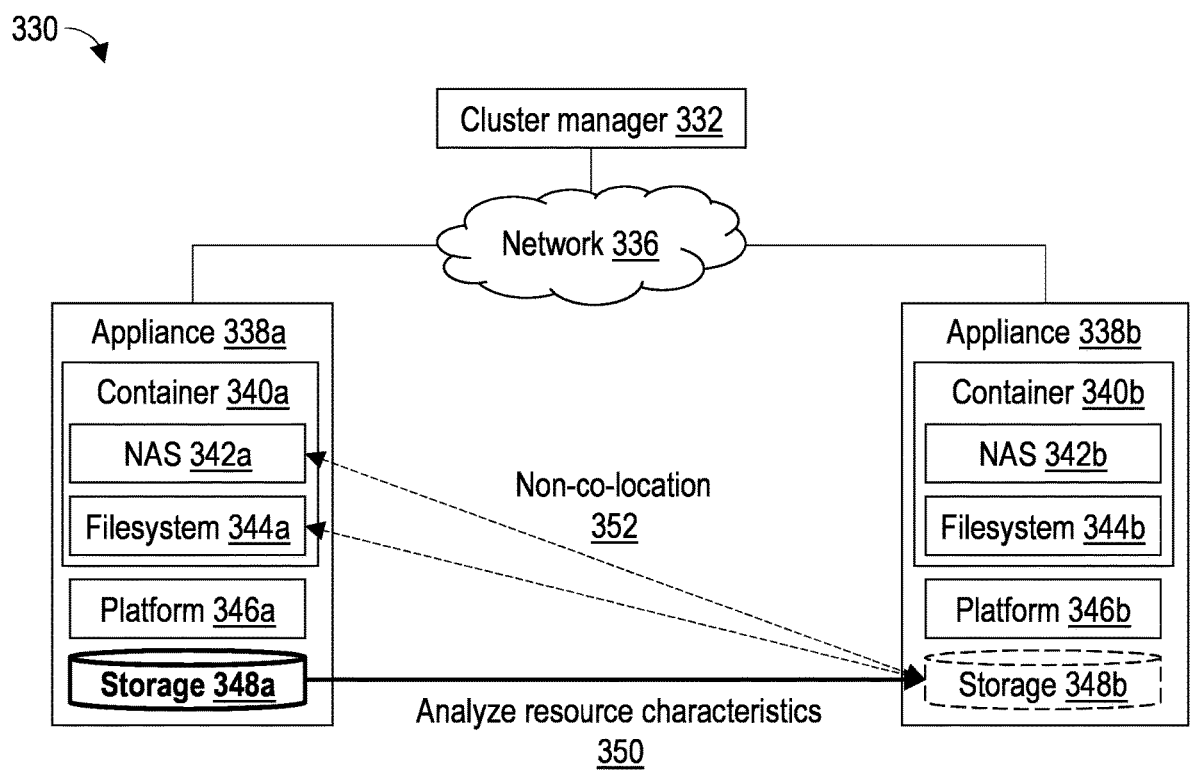

FIGS. 3A and 3B show example clusters 300, 330 in accordance with illustrative embodiments. The examples shown in FIGS. 3A and 3B will be described with reference to the table below.

Table 1 shows example resource characteristics that are discussed in further detail herein. The present placement system allows for multiple scenarios and mitigations when NAS assets such as compute resources and storage resources can be located or migrated among different appliances 308a, 308b, 338a, 338b.

TABLE 1

|  | CPU Core Speed (GHz) | Number of CPU cores to process data per Node | Total Memory (GB) per Node | Storage Type (NVMe, HDD) | Storage latency range (ms) |
| --- | --- | --- | --- | --- | --- |
| Platform 1 | 2.2 | 8 | 96 | NVMe | 0.15 to 0.3 |
| Platform 2 | 2.9 | 26 | 256 | HDD | 2 to 8 |
| Platform 3 | 2.9 | 12 | 96 | HDD | 2 to 8 |
| Platform 4 | 2.1 | 26 | 384 | NVMe | 0.15 to 0.3 |

Example Scenario 1

Referring to FIG. 3A, in an example embodiment the cluster 300 includes a cluster manager 302 communicatively coupled with appliances 308a, 308b over a network 306. With reference to Table 1, the appliance 308a includes a platform 316a configured with platform 3, and the appliance 308b includes a platform 316b configured with platform 4. The appliance 308a also includes storage 318a which is a hard drive having latency between 2-8 ms. The appliance 308b also includes storage 318b which is an NVMe drive having latency between 0.15-0.3 ms.

With continued reference to FIG. 3A and Table 1, in the illustrated example, the cluster manager 302 identifies a placement event for NAS assets associated with the appliance 308a. In particular, the cluster manager obtains resource characteristics corresponding to the platforms 316a, 316b and the storage 318a, 318b. With reference to Table 1, the obtained resource characteristics correspond to platform 3 for the appliance 308a and platform 1 for the appliance 308b. The cluster manager analyzes the resource characteristics 320 to determine a compute capacity and a storage capacity for each appliance 308a, 308b. Analyzing the resource characteristics involves comparing the CPU core count, CPU speed, memory size, storage type, and storage latency of the platforms 316a, 316b and storage 318a, 318b (e.g., comparing platforms 4 and 1). For example, calculating the compute capacity includes the cluster manager 302 determining that the memory size is identical (96 GB per node). The cluster manager further determines that the CPU core count and CPU speed differ somewhat (2.9 GHz versus 2.2 GHZ and 12 cores versus 8). The storage characteristics additionally indicate that the storage type and storage latency differ among the storage 318a that is a hard drive with storage latency of 2-8 ms compared with the storage 318b that is an NVMe drive with storage latency of 0.15-0.3 ms.

The analysis of the resource characteristics 320 results in identifying the appliance 308b as providing improved performance if the NAS 312a is migrated from the initial appliance 308a to the available appliance 308b. For example, analysis of the respective storage characteristics including storage type and storage latency can result in determining that the primary use case of the appliance 308a is for archival data, based on a determination that the data exhibits low read IOPs based on analysis of filesystem patterns from the filesystem 314a, and is persisted to a hard drive with local storage latency between 2-8 ms (platform 3). For example, the cluster manager 302 might determine based on the determined use case and resource characteristics to leverage an ability for the NAS 312a to be non-co-located with the storage 318a. In particular, the cluster manager configures the NAS 312a and the filesystem 314b for remote access to the storage 318a, and deploys the NAS 312a to the appliance 308b. It is appreciated that this determination to leverage non-co-location 322, such as remote access to the storage 318a from the appliance 308b via the filesystem 314b by the NAS 312a in the container 310b, can be made using the determined use case, even if the local storage latency turns out to be more performant compared with the slower latency of remote read IOPs over the network 306, based on the initial analysis of the archival use case that identified low read IOPs. For example, the non-co-location of the NAS 312a and the filesystem 314b allows another future NAS server to leverage the appliance 308a where the new NAS server might offer improved usage of compute-intensive resource characteristics, such as the higher compute capacity including CPU speed and CPU core count (2.9 GHZ and 12 cores) offered by the platform 316a (platform 3) on the appliance 308a.

Accordingly, the cluster manager deploys the NAS assets including the NAS 312a to the identified appliance 308b while keeping the storage 318a on the initial appliance 308a. For example, the cluster manager triggers migrating the NAS 312a from the container 310a on the initial appliance 308a to the container 310b on the identified appliance 308b and updating the associated filesystem 314b on the identified appliance 308b to reference the remote storage 318a on the initial appliance 308a.

Example Scenario 2

With continued reference to FIG. 3A and Table 1, in another example embodiment the appliance 308a includes a platform 316a configured with platform 3 as discussed, and the appliance 308b includes a platform 316b configured with platform 4. The appliances 308a, 308b also include storage 318a, 318b respectively that in this example include NVMe drives having latency between 0.15-0.3 ms.

Referring to FIG. 3A, in the illustrated example, the cluster manager 302 identifies a placement event for NAS assets associated with the appliance 308a. In particular, the cluster manager obtains resource characteristics corresponding to the platforms 316a, 316b and the storage 318a, 318b. Referring to Table 1, the obtained resource characteristics correspond to platform 3 for the appliance 308a and platform 4 for the appliance 308b. The cluster manager analyzes the resource characteristics 320 to determine a compute capacity and a storage capacity for each appliance 308a, 308b. Analyzing the resource characteristics includes comparing the CPU core count, CPU speed, memory size, storage type, and storage latency of the platforms 316a, 316b and the storage 318a, 318b (e.g., comparing platforms 4 and 5). For example, the cluster manager determines based on comparing the resource characteristics that the compute capacity of the appliance 308a appears insufficient for the predicted workload based on analyzing historical compute and memory usage patterns. The cluster manager further determines that the available appliance 308b can better support a more compute-intensive workload relative to the initial appliance 308a. In particular, the platform 316b configured with platform 4 exhibits compute characteristics including lower CPU core speed, 2.1 GHz versus 2.9 GHZ, but substantially higher CPU core count, 26 cores versus 12. Platform 4 also exhibits higher memory size available, 384 GB versus 96 GB per node. As for storage capacity, the cluster manager determines those resource characteristics including the storage characteristics are substantially identical.

The analysis of the resource characteristics 320 results in identifying the appliance 308b as available to provide improved performance to address the insufficient compute capacity of the appliance 308a, if the NAS 312a is migrated from the initial appliance 308a to the available appliance 308b and the associated filesystem 314b is updated to reference the now-remote storage 318a that remains on the initial appliance 308a. For example, analysis of the CPU speed, CPU core count, and memory size can result in determining that the appliance 308b can support more compute-intensive use cases than the appliance 308a. The cluster manager 302 can further determine that the NAS 312a can be better served by the resource characteristics of the platform 316b (platform 4) offered on the available appliance 308b which offers superior CPU speed, CPU core count, and memory size relative to the platform 316a (platform 3) on the initial appliance 308a. The cluster manager might further determine based on the determined use case and resource characteristics to leverage an ability for the NAS 312a and associated filesystem 314b to be non-co-located with the storage 318a. In particular, the cluster manager configures the NAS 312a and the filesystem 314b for remote access to the storage 318a, and deploys the NAS 312a to the appliance 308b. It is appreciated that this determination to leverage non-co-location 322, such as remote access to the storage 318a from the appliance 308b by the NAS 312a and the filesystem 314b, can be made using the determined use case, even if the local storage latency turns out to be more performant compared with the slower network latency of remote read IOPs over the network 306, based on the initial analysis of the compute-intensive use case that identified insufficient compute capacity of the appliance 308a.

Accordingly, the cluster manager deploys the NAS assets including the NAS 312a to the identified appliance 308b while keeping the storage 318a on the initial appliance 308a. For example, the cluster manager triggers migration of the NAS 312a from the container 310a on the initial appliance 308a to the container 310b on the identified appliance 308b and updates the filesystem 314b to reference the now-remote storage 318a on the initial appliance 308a.

Example Scenario 3

Referring to FIG. 3B, in an example embodiment a cluster 330 includes a cluster manager 332 communicatively coupled with appliances 338a, 338b over a network 336. With reference to Table 1, the appliance 338a includes a platform 346a that is configured with platform 2, and the appliance 338b includes a platform 346b that is configured with platform 3. The appliances 338a, 338b also include storage 348a, 348b respectively that in this example includes hard drives (HDD) having latency between 2-8 ms.

With continued reference to FIG. 3B and Table 1, in the illustrated example, the cluster manager 332 identifies a placement event for NAS assets associated with the appliance 338a. In particular, the cluster manager obtains resource characteristics corresponding to the platforms 346a, 346b and the storage 348a, 348b. With reference to Table 1, the obtained resource characteristics correspond to platform 2 for the appliance 338a and platform 3 for the appliance 338b. The cluster manager analyzes the resource characteristics 350 to determine a compute capacity and a storage capacity for each appliance 338a, 338b. Analyzing the resource characteristics includes comparing the CPU core count, CPU speed, memory size, storage type, and storage latency of the platforms 346a, 346b and the storage 348a, 348b (e.g., comparing platforms 2 and 4). For example, the cluster manager 332 determines based on the computed storage capacity that the appliances 338a, 338b exhibit high storage latency (e.g., 2-8 ms) due to the hard drives used for storage 348a, 348b. Further, the compute capacity indicates that platform 346a configured with platform 2 exhibits identical CPU core speed, 2.9 GHz, but substantially higher CPU core count, 26 cores versus 12, along with increased memory size available per node, 256 GB versus 96 GB per node. Platform 4 also exhibits higher memory size available, 384 GB versus 96 GB per node.

The analysis of the resource characteristics 350 results in identifying the appliance 338b as available to provide improved performance for the cluster 330 if the storage 348a is deployed from the initial appliance 348a to the available appliance 348b. For example, analysis of the respective compute characteristics and storage characteristics including storage type and storage latency can result in determining that the primary use case of the appliance 308a is for service level commitments able to accommodate the use of hard drives, and accordingly the usage can be generally resilient to high storage latency, based on a determination that the data is persisted to a hard drive with local storage latency between 2-8 ms (platform 2). For example, the cluster manager 332 might determine based on the determined use case and resource characteristics to leverage an ability for the storage 348a to be non-co-located with the NAS 342a and with the filesystem 344a. In particular, the cluster manager configures the NAS 342a and the filesystem 344a for remote access to the storage 348a, and deploys the storage 348a to the identified appliance 338b. It is appreciated that this determination to leverage non-co-location 352, such as remote access to the storage 348b on the appliance 338b by the NAS 342a and the filesystem 344a, can be made using the determined use case, even if the local storage latency turns out to be more performant compared with the slower network latency of remote read IOPs over the network 336, based on the initial analysis of the service level commitments for the use case of the appliance 338a.

In example embodiments, the cluster manager deploys the storage 348a to the appliance 338b by triggering the block data associated with the storage 348a to be moved or copied to the storage 348b. Additionally, the analysis of compute capacity based on historical compute patterns and resource characteristics of the cluster can further result in a determination that keeping the NAS 342a on the existing appliance 338a results in improved performance of the cluster 330 overall by giving the NAS 342a access to the improved compute capacity and resource characteristics exhibited by the platform 346a (platform 2) that offers superior CPU core count and memory size relative to the platform 346b (platform 3).

As mentioned, at least portions of the present placement system can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the present placement system. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 4. Although described in the context of the present placement system, these platforms may also be used to implement at least portions of other information processing systems in other embodiments.

Figure 4:
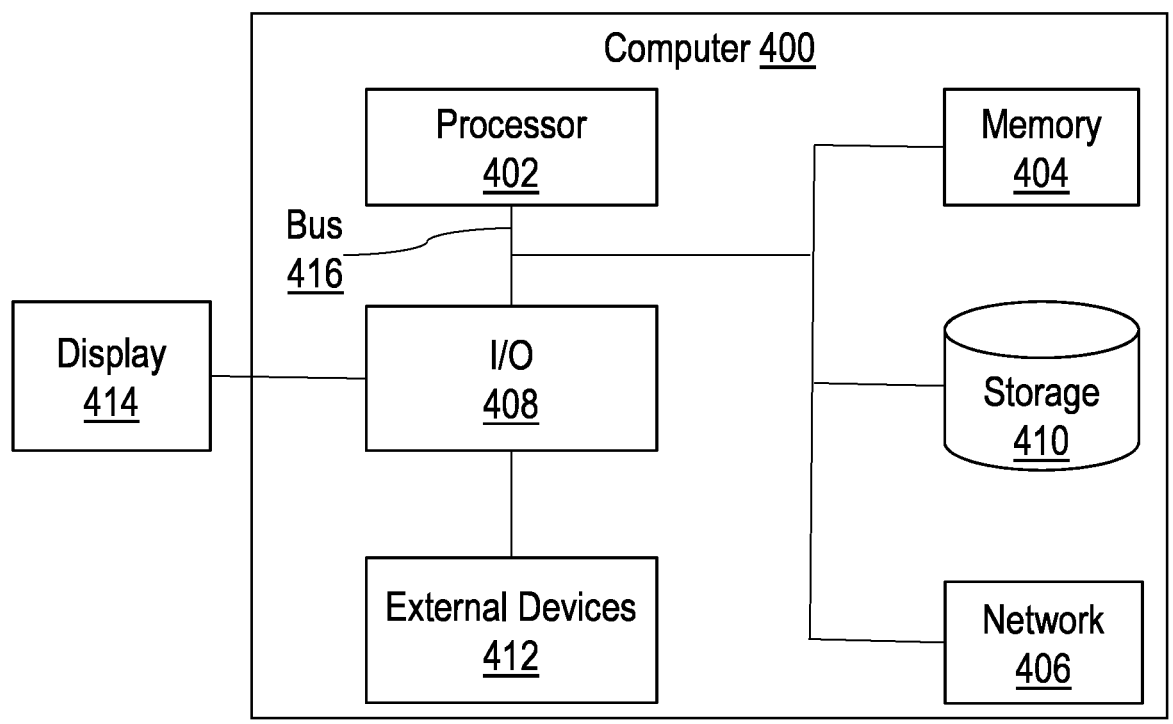
FIG. 4 discloses aspects of a computing entity configured and operable to perform any of the disclosed methods, process, and operations, in accordance with illustrative embodiments.

FIG. 4 illustrates aspects of a computing device or a computing system in accordance with example embodiments. The computer 400 is shown in the form of a general-purpose computing device. Components of the computer may include, but are not limited to, one or more processors or processing units 402, a memory 404, a network interface 406, and a bus 416 that communicatively couples various system components including the system memory and the network interface to the processor.

The bus 416 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 400 typically includes a variety of computer-readable media. Such media may be any available media that is accessible by the computer system, and such media includes both volatile and non-volatile media, removable and non-removable media.

The memory 404 may include computer system readable media in the form of volatile memory, such as random-access memory (RAM) and/or cache memory. The computer system may further include other removable/non-removable, volatile/non-volatile computer system storage media. By way of example only, the storage system 410 may be provided for reading from and writing to a non-removable, non-volatile magnetic media (not shown and typically called a "hard drive") in accordance with the present placement techniques. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 416 by one or more data media interfaces. As has been depicted and described above in connection with FIGS. 1-3B, the memory may include at least one computer program product having a set (e.g., at least one) of program modules that are configured to carry out the functions of the embodiments as described herein.

The computer 400 may also include a program/utility, having a set (at least one) of program modules, which may be stored in the memory 404 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 400 may also communicate with one or more external devices 412 such as a keyboard, a pointing device, a display 414, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 408. Still yet, the computer system may communicate with one or more networks such as a local area network (LAN), a general wide area network (WAN), and/or a public network (e.g., the Internet) via the network adapter 408. As depicted, the network adapter communicates with the other components of the computer system via the bus 416. It should be understood that although not shown, other hardware and/or software components could be used in conjunction with the computer system. Non-limiting examples include microcode, device drivers, redundant processing units, external disk drive arrays, RAID systems, tape drives, data archival storage systems, and the like.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In the foregoing description of FIGS. 1-4, any component described with regard to a figure, in various embodiments of the invention, may be equivalent to one or more like-named components described with regard to any other figure. For brevity, descriptions of these components has not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n." This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the embodiments described herein should be limited only by the appended claims.

What is claimed is:

1. A system comprising:
    at least one processing device including a processor coupled to a memory;
    the at least one processing device being configured to implement the following steps:
        identifying a placement event associated with a NAS asset in a heterogeneous storage cluster, wherein the NAS asset is located on an initial appliance in the cluster;
        obtaining resource characteristics associated with the NAS asset,
        wherein the resource characteristics include:
            compute characteristics, storage characteristics, and network characteristics of the initial appliance, and
            compute characteristics, storage characteristics, and network characteristics of an available appliance in the cluster;
        wherein the storage characteristics include:
            a local storage latency of storage associated with the initial appliance, and
            a remote storage latency of storage associated with the available appliance, and
        wherein the network characteristics include a network latency of a network connecting the initial appliance and the available appliance;
        analyzing the resource characteristics to identify the available appliance,
        wherein analyzing the resource characteristics includes using the compute characteristics, storage characteristics, and network characteristics of the initial appliance or the available appliance to predict expected performance of the cluster if the NAS asset is deployed to the available appliance,
        wherein using the compute characteristics, storage characteristics, and network characteristics of the initial appliance or the available appliance to predict expected performance includes:
            determining the storage characteristics of the initial appliance to be insufficient if the network latency and the remote storage latency are collectively shorter than the local storage latency, and
            configuring the NAS asset for remote access from the available appliance; and
        deploying the NAS asset to the identified appliance,
        wherein the NAS asset is deployed to the identified appliance when at least some of the compute characteristics or storage characteristics of the available appliance exceed corresponding compute characteristics or storage characteristics of the initial appliance.

2. The system of claim 1, wherein the NAS asset comprises a NAS server and an associated filesystem configured for remote access to storage located on a different appliance in the cluster.

3. The system of claim 1, wherein the NAS asset comprises storage that is remotely accessible by a NAS server and an associated filesystem located on a different appliance in the cluster.

4. The system of claim 1, wherein the compute characteristics include one or more of CPU core count, CPU speed, and CPU usage history.

5. The system of claim 1, wherein the resource characteristics comprise memory characteristics including one or more of memory size, memory used, input-output (I/O) request size distribution, I/O request type, ratio of sequential access history to random access history, ratio of read operations to write operations, and I/O per second (IOPs) count.

6. The system of claim 1, wherein the network characteristics include one or more of network latency and network throughput.

7. The system of claim 1, wherein the storage characteristics include one or more of a storage type and storage latency.

8. The system of claim 7, wherein the storage latency includes a first portion attributable to read operations and a second portion attributable to write operations.

9. The system of claim 1, wherein the resource characteristics comprise filesystem characteristics including one or more of a filesystem request size distribution, filesystem metadata access patterns, ratio of random access history to sequential access history, IOPs count, ratio of read operations to write operations, compute latency, and storage latency.

10. The system of claim 9, wherein the compute latency includes a first portion attributable to read operations and a second portion attributable to write operations.

11. The system of claim 1,
    wherein the resource characteristics comprise a compute capacity of the initial appliance and a compute capacity of the available appliance, the compute capacity comprising compute characteristics or memory characteristics of a given appliance,
    wherein analyzing the resource characteristics comprises:
        determining the compute capacity of the initial appliance to be insufficient, and
        configuring the NAS asset for remote access from the available appliance, and
    wherein deploying the NAS asset to the available appliance is performed when the compute capacity of the available appliance exceeds the compute capacity of the initial appliance.

12. A method comprising:
    identifying, by a cluster manager, a placement event associated with a NAS asset in a heterogeneous storage cluster, wherein the NAS asset is located on an initial appliance in the cluster;
    obtaining, by the cluster manager, resource characteristics associated with the NAS asset,
    wherein the resource characteristics include:
        compute characteristics, storage characteristics, and network characteristics of the initial appliance, and
        compute characteristics, storage characteristics, and network characteristics of an available appliance in the cluster,
    wherein the storage characteristics include:
        a local storage latency of storage associated with the initial appliance, and
        a remote storage latency of storage associated with the available appliance,
    wherein the network characteristics include a network latency of a network connecting the initial appliance and the available appliance;
    analyzing, by the cluster manager, the resource characteristics to identify the available appliance,
    wherein analyzing the resource characteristics includes:

using the compute characteristics, storage characteristics, and network characteristics of the initial appliance or the available appliance to predict expected performance of the cluster if the NAS asset is deployed to the available appliance, and comparing the local storage latency against the network latency combined with the remote storage latency; and deploying, by the cluster manager, the NAS asset to the identified appliance, wherein the NAS asset is deployed to the identified appliance despite a determination that the local storage latency is faster than the network latency combined with the remote storage latency.

13. The method of claim 12, wherein the NAS asset comprises a NAS server and an associated filesystem configured for remote access to storage located on a different appliance in the cluster, or wherein the NAS asset comprises storage that is remotely accessible by a NAS server and an associated filesystem located on a different appliance in the cluster.

14. A non-transitory processor-readable storage medium having stored thereon program code of one or more software programs, wherein the program code when executed by at least one processing device causes the at least one processing device to perform the following steps:

identifying a placement event associated with a NAS asset in a heterogeneous storage cluster, wherein the NAS asset is located on an initial appliance in the cluster;

obtaining resource characteristics associated with the NAS asset, wherein the resource characteristics include:

compute characteristics, storage characteristics, and network characteristics of the initial appliance, and compute characteristics, storage characteristics, and network characteristics of an available appliance in the cluster, wherein the storage characteristics include:

a local storage latency of storage associated with the initial appliance, and a remote storage latency of storage associated with the available appliance, and wherein the network characteristics include a network latency of a network connecting the initial appliance and the available appliance;

analyzing the resource characteristics to identify the available appliance, wherein analyzing the resource characteristics includes using the compute characteristics, storage characteristics, and network characteristics of the initial appliance or the available appliance to predict expected performance of the cluster if the NAS asset is deployed to the available appliance, wherein using the compute characteristics, storage characteristics, and network characteristics of the initial appliance or the available appliance to predict expected performance includes:

determining the storage characteristics of the initial appliance to be insufficient if the network latency and the remote storage latency are collectively shorter than the local storage latency, and configuring the NAS asset for remote access from the available appliance; and deploying the NAS asset to the identified appliance, wherein the NAS asset is deployed to the identified appliance when at least some of the compute characteristics or storage characteristics of the available appliance exceed corresponding compute characteristics or storage characteristics of the initial appliance.

15. The method of claim 12, wherein the compute characteristics include one or more of CPU core count, CPU speed, and CPU usage history, wherein the network characteristics include one or more of network latency and network throughput, or wherein the storage characteristics include one or more of a storage type and storage latency.

16. The method of claim 15, wherein the storage latency includes a first portion attributable to read operations and a second portion attributable to write operations.

17. The method of claim 12, wherein the resource characteristics further comprise:

memory characteristics including one or more of memory size, memory used, input-output (I/O) request size distribution, I/O request type, ratio of sequential access history to random access history, ratio of read operations to write operations, and I/O per second (IOPs) count, or filesystem characteristics including one or more of a filesystem request size distribution, filesystem metadata access patterns, ratio of random access history to sequential access history, IOPs count, ratio of read operations to write operations, compute latency, and storage latency.

18. The non-transitory processor-readable storage medium of claim 14, wherein the NAS asset comprises a NAS server and an associated filesystem configured for remote access to storage located on a different appliance in the cluster, or wherein the NAS asset comprises storage that is remotely accessible by a NAS server and an associated filesystem located on a different appliance in the cluster.

19. The non-transitory processor-readable storage medium of claim 14, wherein the compute characteristics include one or more of CPU core count, CPU speed, and CPU usage history, wherein the network characteristics include one or more of network latency and network throughput, or wherein the storage characteristics include one or more of a storage type and storage latency.

20. The non-transitory processor-readable storage medium of claim 14, wherein the resource characteristics further comprise:

memory characteristics including one or more of memory size, memory used, input-output (I/O) request size distribution, I/O request type, ratio of sequential access history to random access history, ratio of read operations to write operations, and I/O per second (IOPs) count, or filesystem characteristics including one or more of a filesystem request size distribution, filesystem metadata access patterns, ratio of random access history to sequential access history, IOPs count, ratio of read operations to write operations, compute latency, and storage latency.

* * * * *